(12) United States Patent
Jakubowski, Jr. et al.

(10) Patent No.: US 6,796,530 B2
(45) Date of Patent: Sep. 28, 2004

(54) METHOD AND APPARATUS FOR PROVIDING PNEUMATIC ENERGY TO AN EJECTOR

(75) Inventors: Thaddeus Jakubowski, Jr., St. Charles, MO (US); John K. Foster, St. Peters, MO (US); Gary T. Johnson, Florissent, MO (US)

(73) Assignee: The Boeing Company, Chicago, IL (US)

( * ) Notice: Subject to any disclaimer, the term of this patent is extended or adjusted under 35 U.S.C. 154(b) by 3 days.

(21) Appl. No.: 10/299,126

(22) Filed: Nov. 18, 2002

(65) Prior Publication Data

US 2004/0094672 A1 May 20, 2004

(51) Int. Cl.[7] .................................................. B64D 1/04
(52) U.S. Cl. ..................................... 244/137.4; 89/1.54
(58) Field of Search ........................ 244/137.4; 89/1.51, 89/1.54

(56) References Cited

U.S. PATENT DOCUMENTS

| | | | | |
|---|---|---|---|---|
| 3,097,480 A | * | 7/1963 | Sohn ........................... | 244/172 |
| 3,133,166 A | * | 5/1964 | Thommen et al. ............ | 218/43 |
| 3,228,385 A | * | 1/1966 | Damm et al. ................. | 124/11 |
| 4,204,456 A | | 5/1980 | Ward | |
| 4,905,568 A | | 3/1990 | Hetzer et al. | |
| 5,583,312 A | | 12/1996 | Jakubowski, Jr. | |
| 5,907,118 A | | 5/1999 | Jakubowski, Jr. et al. | |
| 6,035,759 A | | 3/2000 | Jakubowski, Jr. et al. | |

* cited by examiner

Primary Examiner—Galen Barefoot
(74) Attorney, Agent, or Firm—Shimokaji & Associates, P.C.

(57) ABSTRACT

A stores ejection system for retaining stores on the underside of an aircraft and forcibly jettisoning the stores away from the aircraft is disclosed. The ejection system includes a plurality of ejector mechanisms for releasably holding and jettisoning the stores away from the aircraft, a plurality of storage devices for storing pressurized gas to actuate the ejector mechanisms, and a central control system for maintaining the pressure of the gas, and actuating the release of the gas. The central control system monitors the pressure of the storage devices and heats only those storage devices that have a pressure below the operating pressure.

35 Claims, 6 Drawing Sheets

METHOD AND APPARATUS FOR PROVIDING PNEUMATIC ENERGY TO AN EJECTOR

BACKGROUND OF THE INVENTION

This invention relates generally to store carriers for mounting a releasable store on an aircraft and, more particularly, to a stores ejection system from which stores are released with ejective force applied at forward and aft locations by thrusters which are actuated by cold, clean pressurized gas, such as air.

The store referred to herein may be used to contain munitions, such as bombs, or contain other material to be dropped from an aircraft. Military aircraft used to dispense bombs, rockets, and other stores in flight usually include racks located beneath the wings and fuselage designed to release the stores upon command. Typical racks are shown in U.S. Pat. Nos. 4,043,525; 4,347,777; 5,583,312; 5,907,118; and 6,035,759 each by the same inventor and assignee as in the present application and incorporated herein by reference.

At the time of target acquisition, a release mechanism is activated which results in mechanical release and subsequent forcible ejection of that weapon away from the aircraft. State of the art bomb ejector racks utilize pyrotechnic cartridges that on ignition, generate high pressure gas for actuating the mechanical release mechanism, as well as for providing high pressure to ejection rams which forcibly eject the store from the aircraft. This method was originated at Douglas Aircraft Company, formerly an operating division of McDonnell Douglas Corporation, in 1944, and is currently a widely used method on all weapon release devices.

While such pyrotechnic cartridges provide a weight efficient means of storing and releasing energy as a power source, they also have certain undesirable characteristics. For example, a great deal of cleaning and maintenance is required after firing a pyrotechnic device, at the cost of a great deal of labor and downtime for the aircraft. When fired, the chemical burning of the explosive charge within the pyrotechnic cartridge results in a large amount of residue being deposited within the system. This residue also contains moisture and corrosives. After burning, the moisture in the system tends to further gather debris, form ice, and otherwise clog the internal and external workings of the bomb rack mechanism. Thus, if not properly disassembled and cleaned after a scheduled number of firings, the stores rack will quickly become corroded and unreliable, and will require replacement.

Other problems associated with the use of pyrotechnic cartridges in bomb ejector systems include the necessity for use of hazardous cleaning solvents, which pose their own unique stowage, use, handling, and disposal considerations. Additionally, ground crew post-flight action is required to remove and dispose of the spent cartridges. Removal of live cartridges is required prior to off-loading unreleased stores, further increasing crew workload and turnaround time. Furthermore, prior to cartridge installation, the ground crew must utilize special equipment to conduct stray voltage checks, in order to assure that an inadvertent firing will not occur. Logistically, adequate supplies of cartridges must be maintained to support bomb rack operation, which imposes additional unique shipping, storage, and handling requirements because of their explosive nature. Cartridges have a limited shelf life as well, before becoming unreliable, so date monitoring and inventory control is necessary. Finally, parts life of the stores rack is limited because of the effects of pyrotechnic gas erosion, resulting in significant logistic and cost burdens.

Stores ejection systems are known in the prior art which avoid the use of pyrotechnic cartridges. For example, U.S. Pat. No. 4,204,456 to Ward discloses a pneumatic bomb ejector, which uses a suitable pressurized gas, such as air or nitrogen, as a stored energy source for actuating the ejector. However, the system is disclosed as being utilizable only with a particular type of customized mechanism which does not employ ejector rams to forcibly eject the store. This means that it may only be used for applications wherein it is not necessary to ensure that the store clears the aircraft slipstream by forcibly ejecting it away from the aircraft. Furthermore, the Ward system is not adaptable to the standardized ejection systems in use in almost all existing military aircraft, limiting its practical applicability. Another problem with the Ward system is that the gas is pre-charged prior to operation. However, as the aircraft climbs to altitude, and the ambient temperature drops, the pressure level drops as well. As the pressure level varies, so does the performance output. Without an onboard pressure maintenance system, the stores ejector may not operate reliably.

Another prior art approach is disclosed in U.S. Pat. No. 4,905,568 to Hetzer et al. This patent discloses an ejector mechanism which, like that of Holt, utilizes high pressure gas, preferably nitrogen, as an energy source, with hydraulics as the energy transfer medium. Hetzer does attempt to compensate for pressure variations in the stored accumulator gas by employing heating coils to alter temperature of the gas as altitude changes. However, no central control system is disclosed to independently monitor and control the pressure of multiple accumulators.

Still another prior art approach is disclosed in U.S. Pat. No. 5,583,312 to Jakubowski, Jr. where a renewable energy source is provided to power an ejector mechansim. The renewable energy source comprises and on-board compressor that is used to pressurize one or more accumulators. As pressure varies in an accumulator, gas is released through a vent valve to reduce the pressure, and gas pressure is increased by actuating an on-board compressor. Some problems with an on-board compressor can comprise the compressor adding undesirable weight, occupying undesirable space, requiring large amounts of aircraft electrical power, requiring additional aircraft wiring, generating significant heat which must be managed, high cost and long charge times, particularly where the compressor fills multiple racks.

As can be seen, there is a need for an improved apparatus and method that monitors and maintains the pressure of gas contained in multiple accumulators for use by a stores ejection system.

SUMMARY OF THE INVENTION

In one aspect of the invention, a stores ejection system for retaining a plurality of stores on an aircraft and forcibly jettisoning the stores away from the aircraft, the ejection system may comprise a plurality of ejector mechanisms, each ejector mechanism for releasably holding and releasing a store away from the aircraft; a plurality of storage devices, each storage device for storing pressurized gas at an operating pressure selected for actuating an ejector mechanism to release a store and forcibly jettison the store; a plurality of dump valves, each dump valve movable between a closed position in which a storage device is isolated from an ejector mechanism, and an open position in which pressurized gas is free to flow from the storage device to the ejector mechanism for pneumatic actuation of the ejector mechanism to release and jettison the store; a plurality of heaters, each heater operable to heat the pressurized gas within a storage device to increase the pressure of the gas contained within to an operating pressure; and a thermal central control unit for detecting the pressure within each of the plurality of storage devices, activating a heater to heat an individual storage device that is below the operating pressure, and deactivating the heater when the individual storage device reaches the operating pressure.

In another aspect of the invention, a control system for monitoring and maintaining the pressure in accumulators used to provide energy to operate a stores ejection system on an aircraft may comprise, at least one sensor for providing data indicating the pressure within an accumulator; at least one heater adapted to heat the accumulators; and a central processing unit in communication with said sensor and said heater, for receiving said data, determining whether the pressure within an individual accumulator is below operating pressure, activating a heater until the pressure within said individual accumulator reaches a predetermined level and receiving a signal from a management unit to actuate said stores ejection system.

In another aspect of the invention, a stores ejection system, for holding a store on the underside of an aircraft and forcibly releasing the store away from the aircraft, comprises a plurality of ejector mechanisms, each ejector mechanism for releasably holding and releasing the store away from the aircraft; a plurality of storage devices, each storage device for storing pressurized gas at an operating pressure selected for actuating an ejector mechanism to release the store, each storage device being free of connection to any pressure source on board the aircraft; a plurality of dump valves, each dump valve movable between a closed position in which a storage device is isolated from an ejector mechanism, and an open position in which the pressurized gas stored within the storage device is free to flow from the storage device to an ejector mechanism for pneumatic actuation of an ejector mechanism to release the store; a fill valve for initial charging of said plurality of storage devices, the fill valve being constructed and arranged to permit filling of each storage device only while the aircraft is in a landed condition; a plurality of heaters, each heater operable to heat the pressurized gas within a storage device to increase the pressure of the gas contained within to the operating pressure; and a thermal central control unit for detecting the pressure within each of said plurality of storage devices, activating a heater to heat an individual storage device that is below said operating pressure and deactivating said heater when said individual storage device reaches the operating pressure.

A method of holding and releasing a store from an aircraft while in flight, the aircraft having a stores ejection system comprising a plurality of ejector mechanisms and a plurality of storage devices, the method comprising the steps of connecting the plurality of storage devices with a pressure source located external to the aircraft and filling the plurality of storage devices prior to take-off with a gas until the pressure within each filled storage device reaches an operating pressure selected for actuating an ejector mechanism to release a store and forcibly jettison the store away from the aircraft, monitoring the pressure of the gas contained within each of the plurality of storage devices; detecting a pressure drop in at least one of the plurality of storage devices; and heating the gas in each storage device having a pressure below operating pressure to increase the pressure of the gas contained within to the operating pressure.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Improved apparatuses and methods are provided by the present invention that achieves a proper operating pressure in a plurality of gas storage devices, such as gas accumulators. In doing so, the gas accumulators provide sufficient energy to operate ejector mechanisms that hold and release stores. The present invention can be adapted to various pneumatic ejector mechanisms. The accumulator and ejector mechanisms are commonly used to eject stores carried on an aircraft. The stores may include munitions such as bombs. Unlike prior art stores ejection systems, the present invention has a small weight and space requirement, while also providing a central control unit that monitors and maintains multiple accumulators at a proper operating pressure using heaters, such as, heating coils and/or heating blankets. While each accumulator is commonly used to power ejector mechanisms on an aircraft, the improved apparatuses and methods may also be used in other pneumatically operated mechanisms, such as a munitions loading device on a tank.

Figure 1:
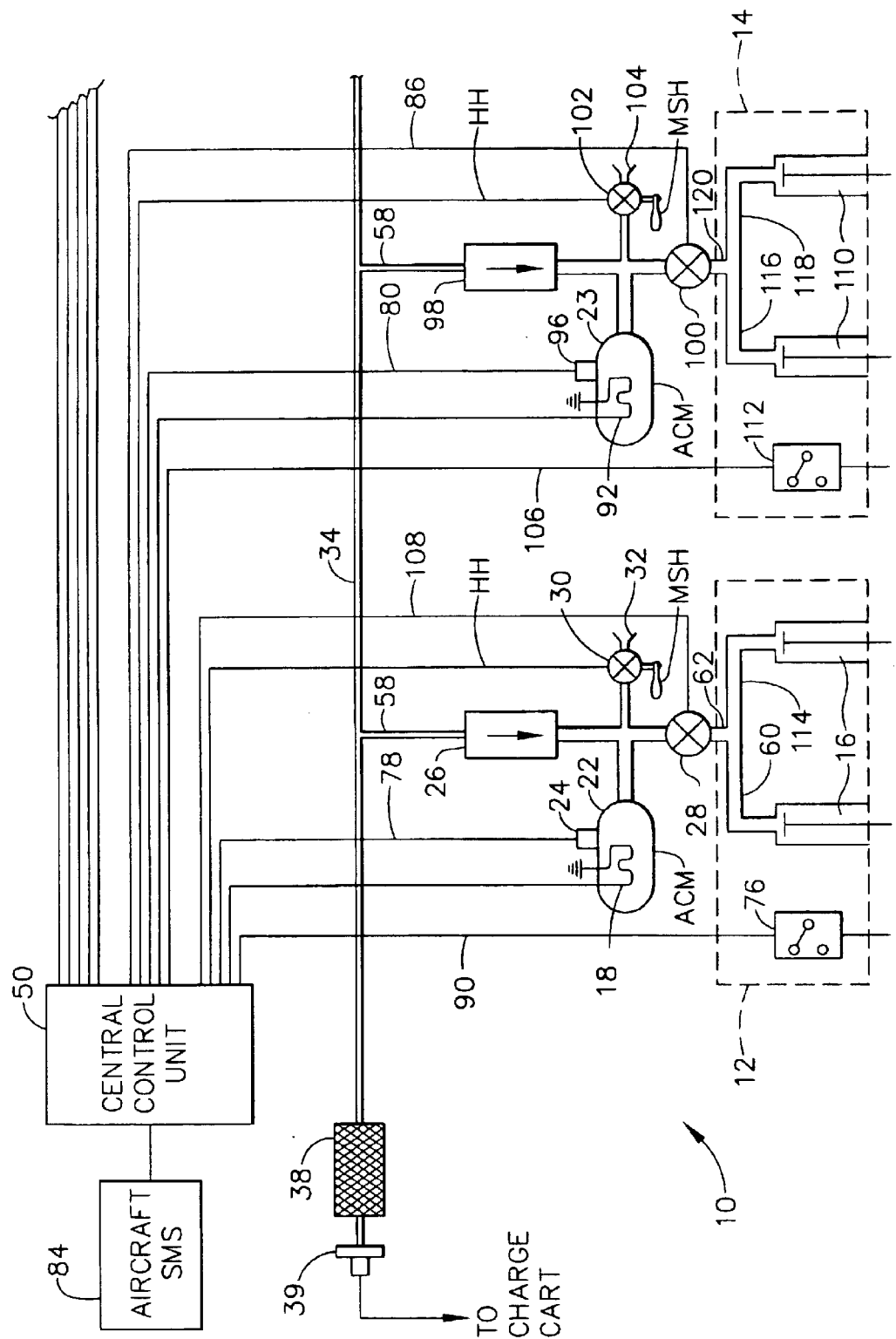
FIG. 1 is a schematic diagram illustrating the stores ejection system with a heating coil according to an embodiment of the present invention.
Figure 2:
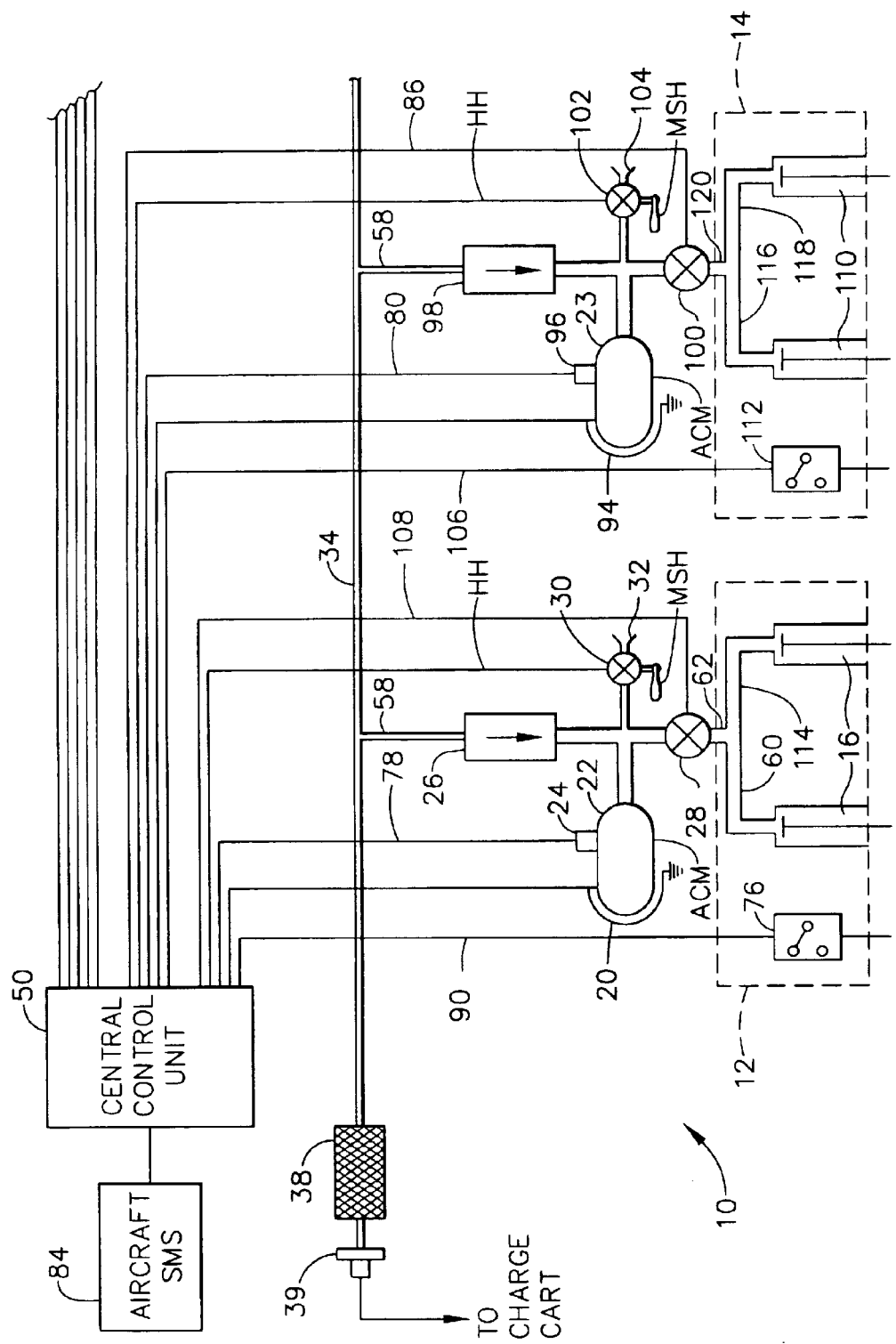
FIG. 2 is a schematic diagram illustrating the stores ejection system with a heating blanket according to an embodiment of the present invention.

Referring now to FIGS. 1 and 2, two embodiments of a pneumatically driven stores ejection system 10 are illustrated schematically. In each illustrated embodiment, two suspension and release equipment (S & RE) modules 12 and 14 are included in the system 10, though in actuality any number of such modules may be employed, depending upon the configuration of the aircraft and weapons system with which the system 10 is to be used. The S & RE modules 12, 14 may be identical stand-alone mechanical units, each preferably comprising a mechanism for releasably holding and releasing a store, a pair of ejector pistons 16 for thrusting the store clear of the aircraft, and an actuation system for actuating the ejector pistons. Each actuation system may include a storage device for pressurized gas, such as an accumulator 22, 23, an accumulator pressure sensor 24, 96, a check valve 26, 98, an ejection dump valve 28, 100 an over-pressure valve 30, 102 and an over-pressure vent 32, 104.

A single ground fill port 34 provides pressurized fluid, preferably compressed air, from a remotely located pressurization unit, such as a charge cart 36 to each of the modules 12, 14. Preferably, the fill port 34 incorporates a filter unit 38 having a hose attach fitting 39 for coupling to the charge cart 36.

Figure 5:
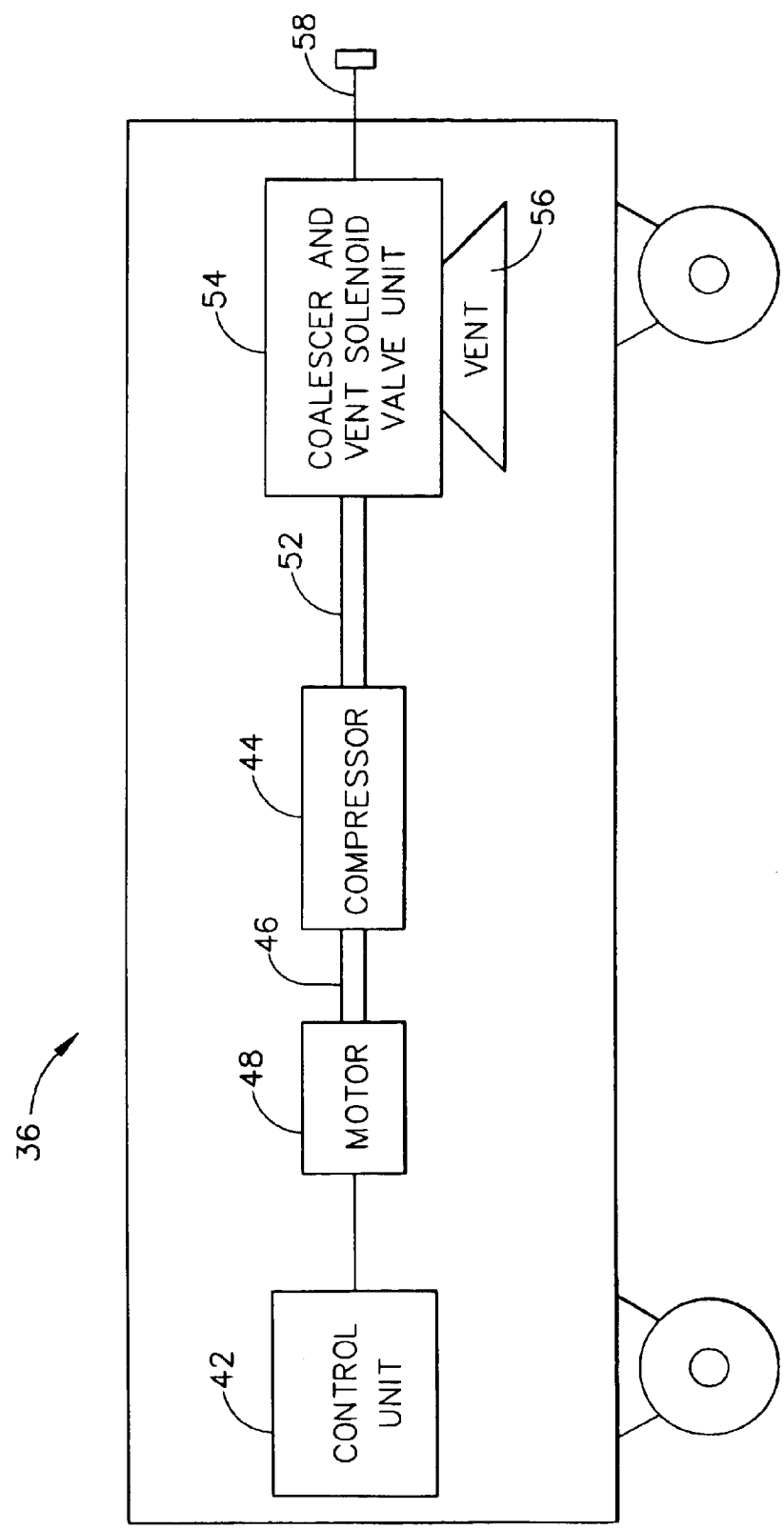
FIG. 5 is a schematic diagram illustrating a charge cart according to an embodiment of the present invention.

Referring to FIG. 5, the charge cart 36 may comprise a compressor 44. In one embodiment of the invention, a four-stage axial piston compressor may be used, although any known type of compressor is suitable for the inventive application and may be alternatively installed. The compressor 44 is preferably driven through a shaft 46 by an electric motor 48 of known type, which in turn is controlled by a cart control unit 42. Upon exiting the compressor 44, the compressed air may travel through a flow passage 52 into a coalescer and vent solenoid valve unit 54, which may provide a dual function of drying the air and also operating as a solenoid valve. From the coalescer unit 54, the dry air exits into the manifold conduit 58, while the excess moisture is vented through a moisture vent 56.

Figure 6:
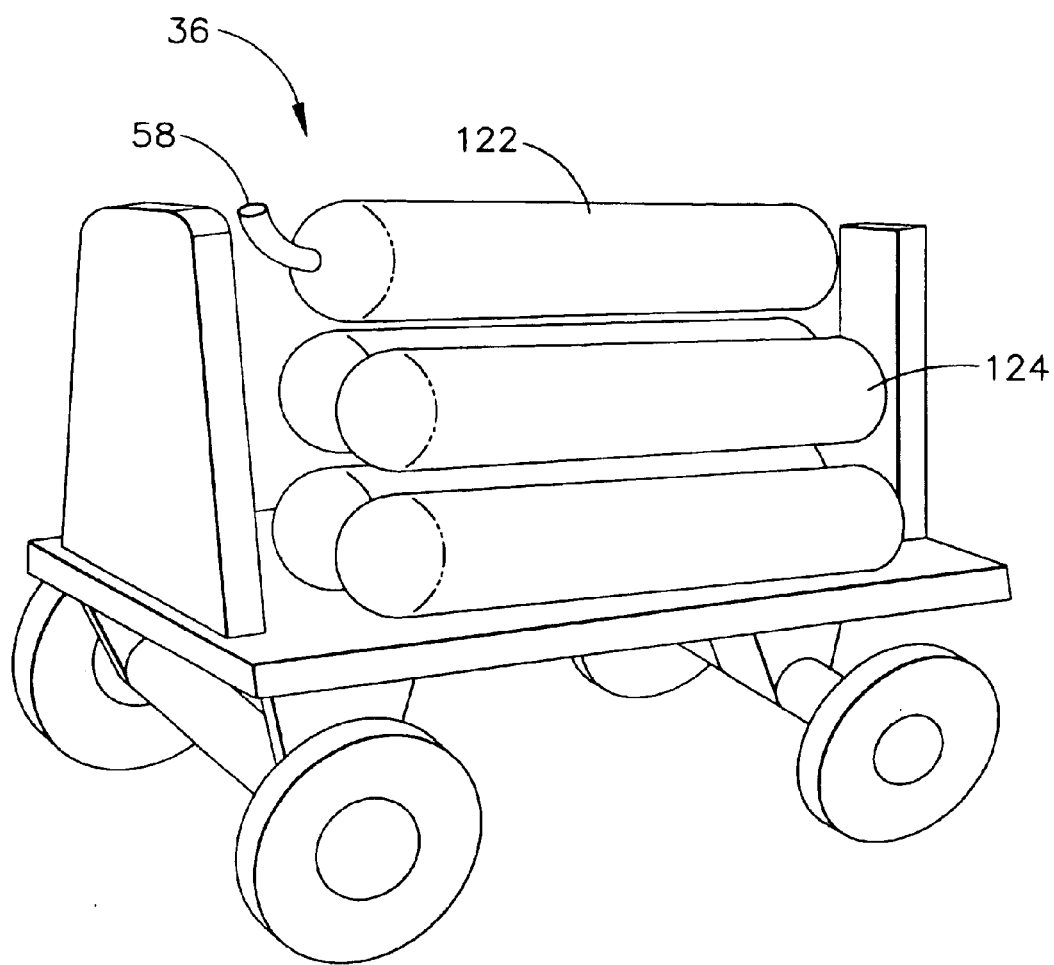
FIG. 6 is a diagram illustrating a bottle cart according to an embodiment of the present invention.

Referring to FIG. 6, in another embodiment, the ground charge cart 36 may comprise an already fielded bottle cart that holds several large bottles of compressed gas, typically nitrogen. The large bottles supply a reservoir of high-pressure gas. The large bottles may come in 3000 psi and 6000 psi ratings. A bottle cart may comprise a pressure intensifier device that allows a consistent supply of gas at 3000 psi or 6000 psi.

In one embodiment, the charge cart 36 shown and described may be used, although many alternate embodiments are possible. For example, the compressor 44 could alternatively be hydraulically driven. Also, while air is used, any known clean gas could be used, and the charge cart 36 could actually comprise a nitrogen generating system. Dry air is desirable in order to minimize system corrosion and because water freezes at high altitude ambient temperatures, resulting in further corrosive conditions within the system. Thus, the a drying unit, such as the coalescer unit 54, may be used. However, the charge cart 36 could be operated without such a unit, albeit with increased required maintenance. Finally, while a single compressor located on a single charge cart 36 operates to supply gas to a multitude of S & RE modules, independent compressors for each S & RE module may be used.

Referring to FIG. 1, when the aircraft electrical system is powered up, a "store present" check is run by control unit 50. A store present switch 76, 112 may be coupled to each module 12, 14. When a store is present, a signal may be transmitted through a control line 90, 106 from the store present switch 76, 112 to the central control unit 50.

If an accumulator 22, 23 is in an unpressurized state, the charge cart 36 may be actuated to pressurize the accumulator 22, 23. The pressure in each accumulator 22, 23 is monitored by a pressure gauge located on the charge cart 36. The pressure gauge may not require electrical power, and in one embodiment, the accumulators 22 and 23 may be pressurized to approximately 6000 psi. When all S & RE modules 12, 14 reach the prescribed pressure, the charge cart 36 is shut down and the manifold conduit 58 is detached from the hose attach fitting 39. The check valve 26, 98 may be a spring-loaded valve that closes when the manifold conduit 58 is detached. In one embodiment, the spring-loaded valve requires no electrical power to function. The accumulators 22, 23 may be pressurized by the charge cart 36 with the aircraft power off. When the aircraft is powered, the control unit 50 runs the store present check. If a store is empty, the control unit 50 opens an over-pressure valve 30, 102 to release the gas contained within an associated accumulator 22, 23 through an over-pressure vent 32, 104. The over pressure vent 32, 104 may also be opened and closed manually by ground personnel using a manual setting handle (MSH).

In order to maintain the pressure of the gas within each accumulator 22, 23 at the correct operating pressure, the central control unit 50 may provide thermal control to heat the pressurized gas within each accumulator 22, 23 upon sensing a drop in pressure to increase the pressure of the gas to the operating pressure. The central control unit 50 detects variances in the pressure of the gas in each accumulator 22, 23 through pressure sensors 24 and 96. A temperature sensor may be provided instead of, or in addition to, the pressure sensor 24, 96 to detect a drop in temperature of the gas in an accumulator 22, 23, where the drop in temperature is indicative of a drop in pressure below the operating pressure. When a temperature sensor is used, the control unit 50 may obtain the mass value of the air contained in an accumulator 22, 23. One method of calculating the mass value is to obtain a pressure reading from the charge cart 36 when the charge cart 36 fills the accumulator 22, 23. Using the pressure reading, volume of the accumulator, and the temperature of the gas, the control unit 50 may calculate the mass value. The control unit 50 may use the mass value to calibrate temperature readings in the accumulators 22, 23 to correspond to a pressure value.

Referring to FIGS. 1 and 2, when a pressure sensor 24, 96 detects a drop in pressure in an accumulator 22, 23, a signal may be sent to the central control unit 50 along a control line 78, 80 indicating the pressure drop. The central control unit 50 may then direct a heater 18, 92, 20, 94, to heat the gas in the accumulator 22, 23 suffering the pressure loss, thereby increasing the pressure of the gas within that accumulator 22, 23 up to the correct operating pressure.

The heater element, as shown in FIG. 1, may be a resistance heater 18, 92 in the form of a coil inserted into the accumulator 22, 23, or as shown in FIG. 2, the heater may be a thermal blanket 20, 94 wrapped around the outside of an accumulator 22, 23. An accumulator 22, 23 may also be wrapped in insulation to reduce the loss of heat. The stores ejection system 10 may include a safety device (not shown) operable to disable the heater 18, 92, 20, 94 if the pressure within the accumulator 22, 23 drops to approximately atmospheric pressure due to a catastrophic leak in the accumulator 22, 23. In another embodiment, the safety device is integrated with the control unit 50. The control unit 50 monitors the pressure in the accumulators 22, 23 and has a control logic routine that prevents the heater 18, 92, 20, 94 for an accumulator 22, 23 from activating when the accumulator 22, 23 is at atmospheric pressure. The stores ejection system 10 may include associated plumbing to prevent overheating of an accumulator 22, 23. It is to be understood that heating devices other than those disclosed or shown herein may also be used.

Each accumulator 22, 23 may be coupled to the aircraft in a different location, and thus each accumulator 22, 23 may experience different thermal loads, resulting from, for example, aerodynamic heating and/or engine heat. The central control unit 50 may monitor each accumulator 22, 23 individually, and heat each accumulator 22, 23 separately so that each remains at the proper operating pressure. Thus, all the accumulators 22, 23 do not need to be heated simultaneously. The central control unit 50 may also open the over-pressure valve 30, through control line HH to vent gas from an accumulator 22, 23 so as to reduce the pressure within. Gas is typically vented from an accumulator 22, 23 seconds or less before a store is released.

Now with reference to FIGS. 1–4, one structural detail of an S & RE module 12, for one embodiment, is illustrated. It should, of course, be noted that the structure of each of the S & RE modules forming a part of the system 10 may be essentially identical, so that FIGS. 3 and 4 could just as well illustrate the S & RE module 14, or any other S & RE module forming a part of the system 10. It should further be noted that this design minimizes the changes necessary to adapt the invention to commercially available S & RE systems. Thus, with the exception of the accumulators 22, 23 and related structure, including the dump valve 28, 100, the illustrated stores ejection system is conventional.

Figure 3:
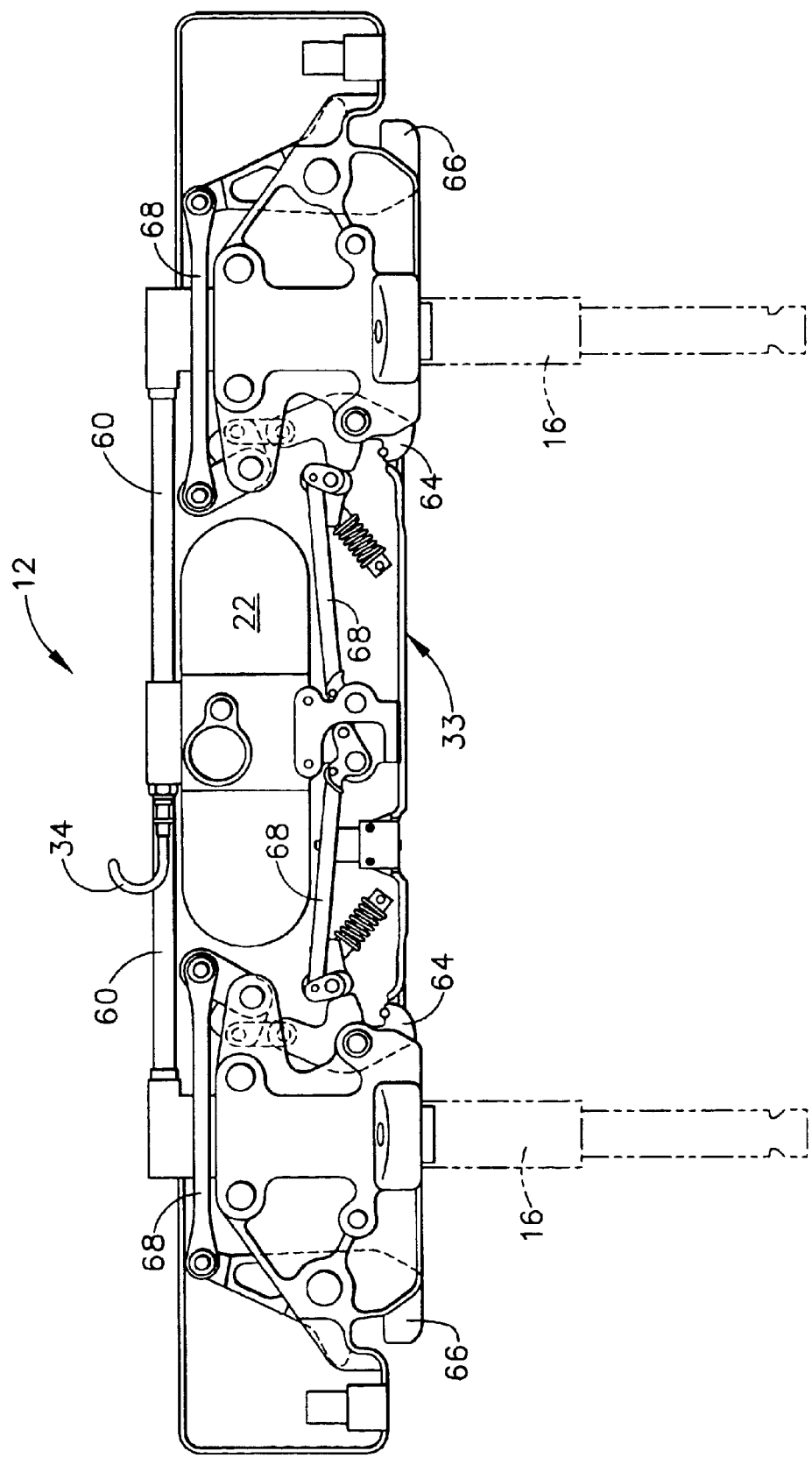
FIG. 3 is diagram illustrating an enlarged, partial cutaway view of the pneumatic actuation system according to an embodiment of the present invention.
Figure 4:
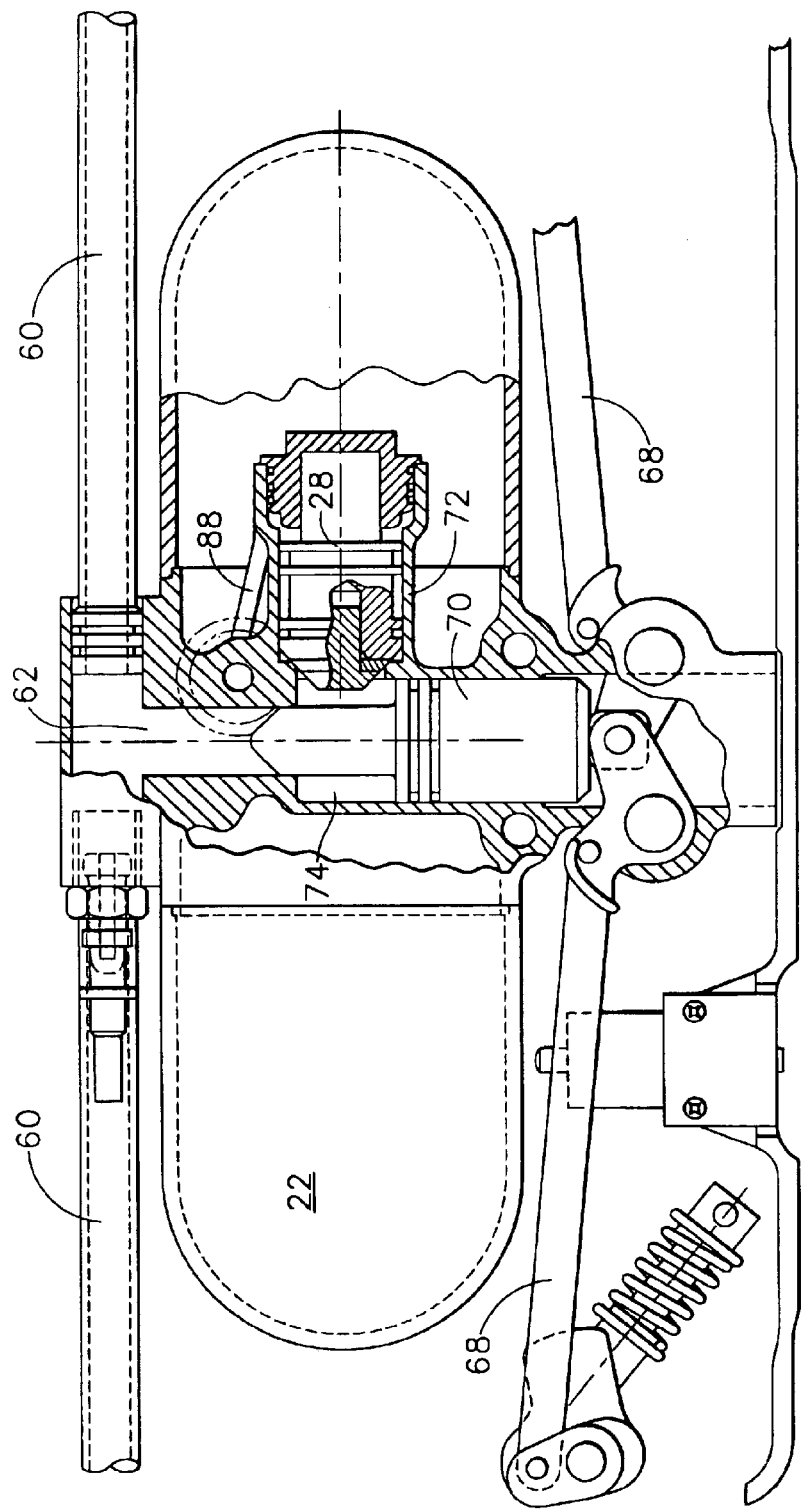
FIG. 4 is a diagram illustrating an enlarged, partial cutaway view of the accumulator according to an embodiment of the present invention.

Referring to FIGS. 3 and 4, passages 60 and 114 provide fluid communication between the accumulator 2223 and the pistons 16 and 110 through dump valve exit flow lines 62 that lie downstream of dump valves 28 and 100. Inside hooks 64 and outside hooks 66 of a type well known in the art are preferably employed to releasably secure the store to the S & RE module 12, 14. The hooks 64, 66 may be actuated to an open position by means of a hinged hook opening linkage 68, which in turn is driven by a hook opening piston 70. The hook opening piston 70 is reciprocatingly driven when a dump valve 28, 100, is opened, thereby permitting pressurized air from an accumulator 22, 23 to travel through port 72 into the valve area, where it further flows into piston chamber 74, acting to drive the piston 70 reciprocatingly downward to actuate the hook opening linkage 68. At the same time, pressurized air is also permitted by the open valve 28 to flow through the dump valve exit flow line 62, 120 and into the passages 60, 114 and 116, 118, thereby actuating the ejector pistons 16 to thrust the store away from the aircraft simultaneously while being released from the hooks 64, 66. Another S & RE module is disclosed in, but not limited to, U.S. Pat. No. 6,035,759 to Jakubowski Jr. et al, and is herein incorporated by reference.

Referring also to FIGS. 1 and 2, aircraft stores management system (SMS) 84 controls the release of the stores through the central control unit 50. On a release command by the SMS 84, through a control line 108, 86, an ejection dump valve 28, 100 is actuated to an open position, permitting pressurized air from an accumulator 22 to flow through port 72, into the valve area, then into the piston chamber 74, where it simultaneously drives the piston 70 downwardly to release the hooks 64, 66 while also flowing through passages 62, 120 and 60, 114, 116, 118 to pressurize and drive each of the ejector pistons 16, 110 to their extended positions, thus fully releasing and thrusting the store clear of the aircraft. As the hooks 64, 66 open, the store present switch 76, 112 detects a "store gone" condition, which is transmitted to the central control unit 50 along control line 90. At the end of an ejector piston 16, 110 stroke, vent ports 88 are exposed, preferably discharging substantially all residual accumulator pressure and permitting the spring-loaded ejector pistons 16, 110 to retract to their stowed position. Alternatively, it may sometimes be desirable to hold some of the residual accumulator 22 pressure to reduce the charge time and power consumption necessary to recharge the system for the next firing. If the aircraft returns with the store on board, the vent valve 30 can be actuated to dump accumulator 22, 23 pressure to prevent unintended release.

Pneumatic S & RE systems 12, 14 may operate with filtered, dry air, thus eliminating the build-up of residue and corrosive materials produced when using pyrotechnics. Cleaning requirements after firing are eliminated and corrosion control maintenance activities are limited to environmental conditions. Electrical stray voltage checks requiring specialized ground test equipment are eliminated and crew workload and turnaround time is reduced.

It should be understood, of course, that the foregoing relates to some embodiments of the invention and that modifications may be made without departing from the spirit and scope of the invention as set forth in the following claims.

We claim:

1. An object ejection system for retaining a plurality of objects on a moving device, monitoring and maintaining an energy source used to operate said object ejection system, and forcibly jettisoning the objects away from the device, the ejection system comprising:

a plurality of ejector mechanisms, each ejector mechanism for releasably holding and releasing an object away from the device;

a plurality of storage devices, each storage device located in a different location on said moving device and experiencing different thermal loads, each storage device for storing pressurized gas at an operating pressure selected for actuating an ejector mechanism to release an object and forcibly jettison the object;

a plurality of dump valves, each dump valve movable between a closed position in which a storage device is isolated from an ejector mechanism, and an open position in which pressurized gas is free to flow from the storage device to the ejector mechanism for pneumatic actuation of the ejector mechanism to release and jettison the object;

a plurality of check valves, each check valve associated with a storage device, each check valve being configured to maintain the pressure in each storage device independent of the other storage devices, a plurality of heaters, each heater operable to heat the pressurized gas within a storage device to increase the pressure of the gas contained therein to an operating pressure; and a thermal central control unit for detecting the pressure within each of said plurality of storage devices, activating a heater to heat an individual storage device independently from other storage devices, that is below said operating pressure, and deactivating said heater when said individual storage device reaches said operating pressure.

2. The ejection system of claim 1 wherein said thermal central control unit comprises a sensor capable of operatively detecting said variance in gas pressure in a storage device, from said operating pressure.

3. The ejection system of 2 wherein the sensor operates to detect the temperature of the pressurized gas in a storage device.

4. The ejection system of claim 1 wherein the heater comprises a resister inserted within the accumulator.

5. The ejection system of claim 1 wherein the heater comprises a heating blanket wrapped around the storage device.

6. The ejection system of claim 1 further comprising a fill valve configured for connection with a pressure source for filling each storage device with said gas, said pressure source located external to the device and not adapted for flight with the device.

7. The election system of claim 6 further comprising a pressure gauge to provide visual indication of the pressure within each storage device during filling of each storage device from the external pressure source.

8. The ejection system of claim 1 further comprising a safety device to disable the heater if the pressure within the storage device drops to approximately atmospheric pressure.

9. The ejection system of claim 1 further comprising a vent valve for reducing the pressure within a storage.

10. The ejection system of claim 1 wherein said storage device is an accumulator.

11. The ejection system of claim 1 wherein the ejector mechanism comprises at least one hook pivotable between a closed position for holding the object on the device, and an open position for releasing the object from the device.

12. The ejection system of claim 11 wherein the ejector mechanism comprises an ejector piston for ejecting the object away from the device.

13. A control system for monitoring and maintaining the pressure in a plurality of accumulators, each accumulator experiencing different thermal loads, said accumulators used to provide energy to operate a stores ejection system on an aircraft, the control system comprising:
  at least one sensor for providing data indicating the pressure within an individual accumulator;
  at least one heater adapted to heat said individual accumulator,
  at least one check valve in association with each said accumulator configured to prevent the pressure change in one said accumulator from affecting the pressure in a different said accumulator; and
  a central processing unit in communication with said sensor and said heater for, receiving said data, determining whether the pressure within said individual accumulator is below a predetermined level, independently activating said heater until the pressure within said individual accumulator reaches said predetermined level and receiving a signal from a management unit to actuate said stores ejection system,
  wherein said central processing unit is adapted to actuate a plurality of dump valves coupled to said accumulators,
  wherein said central processing unit is adapted to check if said stores are present, and
  wherein said central processing unit is adapted to open an over-pressure valve coupled to said accumulators.

14. The control system of claim 13 wherein said data comprises the pressure within said accumulator.

15. The control system of claim 13 wherein said data comprises the temperature within said accumulator.

16. The control system of claim 13 wherein the heater comprises a resister inserted within said accumulator.

17. The control system of claim 13 wherein the heater comprises a heating blanket coupled to the surface of said accumulator.

18. The control system of claim 13 further comprising a safety device to disable the heater if the pressure within the storage device drops to approximately atmospheric pressure.

19. The control system of claim 13 further comprising a vent valve for reducing the pressure within said accumulator.

20. The control system of claim 13 wherein the stores ejection system comprises at least one hook pivotable between a closed position for holding the object on the aircraft, and an open position for releasing the store from the aircraft.

21. The control system of claim 20 wherein the stores ejection system comprises an ejector piston for ejecting the object away from the aircraft.

22. The control system of claim 13 wherein said predetermined level is the operating pressure of said stores ejection system.

23. A stores ejection system for holding a store on the underside of an aircraft and forcibly releasing the store away from the aircraft, the ejection system comprising:
  a plurality of ejector mechanisms, each ejector mechanism for releasably holding and releasing the store away from the aircraft;
  a plurality of storage devices, each storage device experiencing different thermal loads, each storage device for storing pressurized gas at an operating pressure selected for actuating an ejector mechanism to release the store, each storage device being free of connection to any pressure source on board the aircraft;
  a plurality of dump valves, each dump valve movable between a closed position in which a storage device is isolated from an ejector mechanism, and an open position in which the pressurized gas stored within the storage device is free to flow from the storage device to an ejector mechanism for pneumatic actuation of an ejector mechanism to release the store;
  a fill valve for initial charging of said plurality of storage devices, the fill valve being constructed and arranged to permit filling of each storage device only while the aircraft is in a landed condition;
  a plurality of heaters, each heater operable to heat the pressurized gas within a storage device to increase the pressure of the gas contained therein to the operating pressure
  a plurality of check valves, each check valve configured to isolate the pressure fluctuations in one storage device from the remaining storage devices; and
  a thermal central control unit for detecting the pressure within each of said plurality of storage devices, independently activating a heater to heat an individual storage device that is below said operating pressure and independently deactivating said heater when said individual storage device reaches said operating pressure.

24. The stores ejection system of claim 23 wherein the fill valve is configured for connection with a pressure source, wherein said pressure source is located external to the aircraft and not adapted for flight with the aircraft.

25. The stores ejection system of claim 24 wherein the ejector mechanism comprises at least one hook pivotable between a closed position for holding the store on the aircraft, and an open position for installation of the store on the aircraft and release of the store from the aircraft.

26. The stores ejection system of claim 23 wherein the ejector mechanism comprises an ejector piston for ejecting the store away from the aircraft.

27. The stores ejection system of claim 23 wherein said storage device is an accumulator.

28. A control system for monitoring and maintaining the pressure in a plurality of aircraft accumulators throughout the aircraft's flight regime, said accumulators used to provide energy to operate the aircraft's stores ejection system, the control system comprising:
  at least one sensor for providing data indicating the pressure within an accumulator;
  at least one heater adapted to heat said accumulator;
  a vent valve for reducing the pressure within said accumulator
  at least one check valve in association with each said accumulator configured to prevent the pressure change in one said accumulator from affecting the pressure in a different said accumulator; and
  a central processing unit in communication with said sensor and said heater for, receiving said data, determining whether the pressure within said accumulator is below an operating pressure of said stores ejection system, independently activating said heater until the pressure within said accumulator reaches said operating pressure and receiving a signal from a management unit to actuate said stores ejection system.

29. The control system of claim 28 wherein said data comprises the pressure within said accumulator.

30. The control system of claim 28 wherein said data comprises the temperature within said accumulator.

31. The control system of claim 28 further comprising a safety device to disable the heater if the pressure within the storage device drops to approximately atmospheric pressure.

32. A method of holding and releasing a store from an aircraft while in flight, the aircraft having a stores ejection system comprising a plurality of ejector mechanisms and a plurality of storage devices, the method comprising the steps of:

connecting said plurality of storage devices with a pressure source located external to the aircraft and filling said plurality of storage devices prior to take-off with a gas until the pressure within each filled storage device reaches an operating pressure selected for actuating an ejector mechanism to release a store and forcibly jettison the store away from the aircraft, wherein each said storage device is configured with a check valve to isolate said plurality of storage devices from each other;

monitoring the pressure of the gas contained within each of said plurality of storage devices;

detecting a pressure drop in at least one of said plurality of storage devices;

independently heating the gas in each storage device having a pressure drop below operating pressure to increase the pressure of the gas contained therein to said operating pressure; and controlling said heating with a central processing unit.

33. The method of claim 32 where said step of heating the gas in each storage device having a pressure drop below operating pressure, to increase the pressure of the gas contained therein to said operating pressure comprises:

operatively detecting the pressure in the storage device and sending a signal to a thermal central control unit to heat the gas in the storage device to a predetermined limit above the operating pressure.

34. The method of claim 32 where said step of heating the gas in each storage device having a pressure drop below operating pressure, to increase the pressure of the gas contained therein to said operating pressure comprises:

providing an electrical current through a heating coil disposed within said heating device.

35. The method of claim 32 where said step of heating the gas in each storage device having a pressure drop below operating pressure, to increase the pressure of the gas contained therein to said operating pressure comprises:

providing an electrical current through a heating blanket disposed on the surface of said heating device.

* * * * *